United States Patent
Blaabjerg et al.

(10) Patent No.: US 12,404,842 B2
(45) Date of Patent: Sep. 2, 2025

(54) METHOD FOR MANUFACTURING A WIND TURBINE, TOWER OF A WIND TURBINE AND WIND TURBINE

(71) Applicant: Siemens Gamesa Renewable Energy A/S, Brande (DK)

(72) Inventors: Hans Kjaer Blaabjerg, Gevded (DK); Vikash Choudhary, Himachal Pradesh (IN)

(73) Assignee: Siemens Gamesa Renewable Energy A/S, Brande (DK)

( * ) Notice: Subject to any disclaimer, the term of this patent is extended or adjusted under 35 U.S.C. 154(b) by 677 days.

(21) Appl. No.: 17/310,227

(22) PCT Filed: Jan. 17, 2020

(86) PCT No.: PCT/EP2020/051084
§ 371 (c)(1),
(2) Date: Jul. 27, 2021

(87) PCT Pub. No.: WO2020/156831
PCT Pub. Date: Aug. 6, 2020

(65) Prior Publication Data
US 2022/0195996 A1 Jun. 23, 2022

(30) Foreign Application Priority Data

Jan. 31, 2019 (EP) ..................................... 19154716

(51) Int. Cl.
*F03D 80/80* (2016.01)
*F03D 13/10* (2016.01)
(Continued)

(52) U.S. Cl.
CPC ............. *F03D 80/85* (2016.05); *F03D 13/10* (2016.05); *F03D 13/20* (2016.05); *F03D 13/40* (2016.05);
(Continued)

(58) Field of Classification Search
CPC ................................. F03D 80/85; F03D 13/40
See application file for complete search history.

(56) References Cited

U.S. PATENT DOCUMENTS

| 7,982,330 B1* | 7/2011 | Ueno ...................... F03D 13/20 290/55 |
| 2010/0006710 A1* | 1/2010 | Lyness .................... F03D 80/85 290/55 |

(Continued)

FOREIGN PATENT DOCUMENTS

| CN | 101737273 A | 6/2010 |
| CN | 102312794 A | 1/2012 |

(Continued)

OTHER PUBLICATIONS

European Search Report and Written Opinion of the European Searching Authority issued Jul. 29, 2019 for Application No. 19154716.5.

(Continued)

*Primary Examiner* — Livius R. Cazan
(74) *Attorney, Agent, or Firm* — Schmeiser, Olsen & Watts, LLP

(57) ABSTRACT

Provided is a method for manufacturing a wind turbine, the wind turbine including a high voltage cable configured to connect a generator of the wind turbine with a switch gear of the wind turbine, the method: a) guiding the high voltage cable inside a tower of the wind turbine from an upper part of the tower to a lower part of the tower, and b) returning the high voltage cable at the lower part of the tower up again. Returning the high voltage cable at the lower part of the tower up again simplifies storing an additional length of the high voltage cable inside the tower.

11 Claims, 7 Drawing Sheets

(51) Int. Cl.
*F03D 13/20* (2016.01)
*F03D 13/40* (2016.01)

(52) U.S. Cl.
CPC ..... *F05B 2230/61* (2013.01); *F05B 2240/912* (2013.01); *F05B 2260/02* (2013.01)

(56) References Cited

U.S. PATENT DOCUMENTS

| | | | |
|---|---|---|---|
| 2010/0122508 A1 | 5/2010 | Kristensen | |
| 2011/0061314 A1* | 3/2011 | Muhlhauser | F03D 80/85 52/745.18 |
| 2011/0138730 A1 | 6/2011 | Nies | |
| 2011/0314750 A1 | 12/2011 | Nies | |
| 2015/0275850 A1* | 10/2015 | Numajiri | F03D 80/50 290/55 |
| 2017/0138351 A1* | 5/2017 | Tobinaga | F03D 80/82 |
| 2017/0237248 A1* | 8/2017 | Wang | F03D 80/85 290/55 |

FOREIGN PATENT DOCUMENTS

| | | |
|---|---|---|
| CN | 102384040 A | 3/2012 |
| EP | 2518844 A1 | 10/2012 |
| EP | 3 085 958 A1 | 10/2016 |
| EP | 3 406 899 A1 | 11/2018 |
| GB | 2 496 129 A | 5/2013 |

OTHER PUBLICATIONS

International Search Report & Written Opinion dated May 6, 2020 for PCT/EP2020/051084.

* cited by examiner

METHOD FOR MANUFACTURING A WIND TURBINE, TOWER OF A WIND TURBINE AND WIND TURBINE

CROSS-REFERENCE TO RELATED APPLICATIONS

This application claims priority to PCT Application No. PCT/EP2020/051084, having a filing date of Jan. 17, 2020, which is based on EP Application No. 19154716.5, having a filing date of Jan. 31, 2019, the entire contents both of which are hereby incorporated by reference.

FIELD OF TECHNOLOGY

The following relates to a method for manufacturing a wind turbine, a tower of a wind turbine and a wind turbine.

BACKGROUND

In a wind turbine, the kinetic energy of the wind is transformed into electrical energy using a generator. The generator is arranged in a nacelle at the top of the tower of the wind turbine. The electrical energy is guided from the generator through a high voltage cable to a switch gear in a transition piece.

Wind turbines are often assembled by erecting the tower of the wind turbine on the transition piece, the transition piece being connected to a foundation of the wind turbine such as a monopile. The tower including the high voltage cable is transported to the wind harvesting site and erected there on the transition piece. The high voltage cable is stored in the tower during transport. It includes the length of the tower itself and the additional (free) length necessary for the electrical connection within the transition piece. The additional length depends on the distance between the lower end of the tower and the switch gear in the transition piece. As the height of transition pieces keeps increasing, for example a "Super Extended Transition Piece" can have a height of 40 meters or more, often also the distance between the lower end of the tower and the switch gear in the transition piece is increasing. Therefore, an increased additional length of the high voltage cable necessary for the electrical connection within the transition piece needs to be stored in the tower prior to erecting it onto the transition piece.

SUMMARY

An aspect relates to an improved method for manufacturing a wind turbine, an improved tower of a wind turbine and an improved wind turbine.

Accordingly, a method for manufacturing a wind turbine is proposed. The wind turbine comprises a high voltage cable configured to connect a generator of the wind turbine with a switch gear of the wind turbine. The method comprises the steps of:

a) guiding the high voltage cable inside a tower of the wind turbine from an upper part of the tower to a lower part of the tower, and b) returning the high voltage cable at the lower part of the tower up again.

Returning the high voltage cable at the lower part of the tower up again simplifies storing an additional length of the high voltage cable inside the tower. The additional length of the high voltage cable is a length necessary for the connection with the switch gear. The switch gear is, for example, arranged within a transition piece of the wind turbine. The transition piece is, for example, mounted on top of a foundation of the wind turbine.

Furthermore, returning the high voltage cable at the lower part of the tower up again allows to better lower the additional length of the high voltage cable towards the switch gear. For example, it allows to lower the high voltage cable in a controlled manner towards the switch gear.

By having the step of returning the high voltage cable at the lower part of the tower up again, a larger additional length of the high voltage cable can be stored in the tower, e.g., during transport by a jack-up vessel to a wind harvesting site. For example, an additional length of the high voltage cable of larger than 2 meters, larger than 5 meters, larger than 10 meters and/or larger than 20 meters can be stored in the tower. Thus, wind turbines having a larger distance between the lower end of the tower and the switch gear can be manufactured. In particular, wind turbines with a larger transition piece can be manufactured. For example, wind turbines with a "Super Extended Transition Piece" having a height of about 40 meters can be manufactured.

A wind turbine is an apparatus to convert the wind's kinetic energy into electrical energy. The wind turbine comprises, for example, a rotor having one or more blades, a nacelle including the generator and the tower holding, at its top end, the nacelle. The tower of the wind turbine may be connected via the transition piece to a foundation of the wind turbine such as a monopile in the sea bed.

The high voltage cable transfers the electrical energy generated by the wind turbine to the switch gear. The high voltage cable connects the generator and the switch gear in particular in one continuous (one piece) length. The high voltage cable has, for example, a weight of 10 kg per meter or larger. The high voltage cable transfers, for example, an electrical energy with a voltage range of, for example, 66 kV.

The method comprises the step a) of guiding the high voltage cable inside the tower of the wind turbine from an upper part of the tower to a lower part of the tower. In particular, a first portion of the high voltage cable is guided from the upper part of the tower to the lower part of the tower. The upper part of the tower may, for example, be the upper most platform of the tower. The lower part of the tower may, for example, be the lower most platform of the tower or a part below the lower most platform of the tower. Guiding the high voltage cable from the upper part of the tower to the lower part of the tower may, for example, include fixing the cable to portions of the wind turbine inside the tower such as a ladder, a wall portion or a platform portion.

The method comprises the step b) of returning the high voltage cable at the lower part of the tower up again. In particular, a second portion of the high voltage cable is returned such that it is guided from the lower part of the tower up again. The second portion of the high voltage cable has a length that is equal to or larger than the distance between the lower end of the tower, in particular the lower part of the tower, and the switch gear.

According to an embodiment, the high voltage cable is returned at the lower part of the tower up again such that it forms a U-shape.

In particular, the first portion of the high voltage cable guided from the upper part of the tower to the lower part of the tower is continuous with a first leg of the U-shape and a second leg of the U-shape is continuous with the second portion of the high voltage cable which is returned up again.

Having the U-shape of the high voltage cable simplifies lowering the high voltage cable towards the switch gear.

According to embodiments, the high voltage cable is returned at the lower part of the tower up again by at least 2 meters, by at least 5 meters, by at least 10 meters, or by at least 20 meters.

According to a further embodiment, the high voltage cable is returned at least up to a first platform of the tower.

The first platform of the tower may be a lower or the lowest most platform of the tower or may be any other platform of the tower. The first platform may, for example, be a low voltage platform or a bolt platform of the tower.

The tower of the wind turbine comprises in its interior one or more platforms such as the first platform. The platforms can be configured for carrying electrical or mechanical devices required for the operation of the wind turbine, such as the low voltage platform carrying a low voltage transformer. The platforms can also be configured as a working platform, e.g., for performing work during the assembly of the wind turbine and/or maintenance work during the operation of the wind turbine, such as the bolt platform.

The returning of the high voltage cable is, for example, handled from the first platform, e.g., with the help of devices or workers on the first platform. Furthermore, also the lowering of the high voltage cable towards the switch gear may be handled from the first platform.

According to a further embodiment the high voltage cable is returned by a winch, in particular by a winch located on the first platform or on a second platform of the tower and/or including a rope connected to a free end of the high voltage cable.

The second platform is, in particular, locate above the first platform.

In particular, the winch pulls up the second portion of the high voltage cable. In particular, the winch is connected to a free end of the high voltage cable. For example, the winch includes a rope which is connected to the free end of the high voltage cable. The winch winds up the rope, thereby pulling up the second portion of the high voltage cable.

The winch can also be used for lowering the high voltage after erecting the tower on the transition piece.

Returning the high voltage cable by the winch allows to better lift up the second portion of the high voltage cable. In particular, it allows to lift up a longer, and therefore, heavier portion of the high voltage cable.

According to a further embodiment, the method comprises the step of transporting, in particular by a vessel, the tower produced in accordance with steps a) and b) to a wind harvesting site.

Thus, it is possible to have the high voltage cable safely stored inside the tower when transporting the tower, in particular in a vertical position, to the wind harvesting site.

According to a further embodiment, the method comprises the step of arranging the tower on a transition piece of the wind turbine. The transition piece is connected to a foundation of the wind turbine. Furthermore, the method comprises the step of lowering the high voltage cable into the transition piece, in particular lowering the high voltage cable towards the switch gear in the transition piece.

In particular, the portion of the high voltage cable that is returned inside the tower, i.e. the second portion of the high voltage cable, is lowered into the transition piece.

According to a further embodiment, the high voltage cable is lowered into the transition piece by lowering the U-shape of the high voltage cable into the transition piece.

According to a further embodiment, the high voltage cable is lowered into the transition piece by lowering it through cutouts in one or more platforms of the tower and/or the transition piece.

Lowering the high voltage cable through cutouts in one or more platforms of the tower and/or the transition piece allows to lower the high voltage cable into the transition piece in a state in which the corresponding platform(s) is/are already installed.

According to a further embodiment, one or more of the cutouts include a roller assembly to guide the high voltage cable through the cutout.

The roller assembly includes for example rollers arranged at the edge portion of the cutouts. When lowering the high voltage cable through the cutouts, the rolling movement of the rollers allows easier and smoother lowering of the high voltage cable. Having the roller assembly allows to protect the high voltage cable from damage, e.g., scratching, during the lowering through the cutouts.

According to a further embodiment, the method comprises the step of fixing the high voltage cable to a ladder of the wind turbine.

In particular, the step of fixing the high voltage cable to a ladder includes fixing the high voltage cable to the ladder at various portions of the ladder. The ladder may be arranged inside the transition piece. The step may also include fixing the high voltage cable to a ladder inside the tower.

By way of fixing the high voltage cable to the ladder of the wind turbine a weight or a portion of the weight of the high voltage cable can be carried by the ladder. Particularly, through fixing the high voltage cable to the ladder of the transition piece, it is possible to use a higher transition piece that requires a longer, and, therefore, heavier high voltage cable.

In embodiments, the method comprises the step of connecting the high voltage cable with the switch gear.

According to a further embodiment, the method comprises the step of hoisting a lower part of the high voltage cable into a tray of a support structure. The support structure is in particular located on a switch gear footbridge. Furthermore, the method comprises the step of adjusting an inclination of the tray to a length of the high voltage cable.

Having the support structure with the tray allows to guide the high voltage cable towards the switch gear. In particular, it allows to guide the high voltage such that it passes a vertical center line of the tower. In particular, it allows to guide the high voltage from a first radial position ("radial" with respect to the center line) at which it is coming down from the tower, to a second radial position at which the switch gear is located. Thereby, the high voltage cable is guided from a vertical direction by the tray to a horizontal orientation or an inclined plane orientation.

The tray may also be configured to guide the high voltage cable from the horizontal orientation or the inclined plane orientation back to the vertical direction and towards the switch gear, e.g. by a bent portion bent towards the switch gear.

The lower part of the high voltage cable is, in particular, a lower part of the second portion of the high voltage cable.

The tray is, for example, an elongated tray. The tray comprises, for example, metal. The tray is, in particular, configured to receive and/or hold the lower part of the high voltage cable or a portion thereof. The tray includes, for example, an elongated recess to receive the lower part of the high voltage cable or a portion thereof. The tray has, for example, a concave cross-section. The tray is, for example, a gutter. The tray may include, continuous to the inclinable portion, a bent portion configured to guide the high voltage cable back to the vertical direction.

The tray is, in particular, arranged such that an inclination of the tray can be adjusted. The inclination of the tray can, in particular, be adjusted between a horizontal orientation and an inclined plane orientation. The inclination may be continuously adjustable or may be stepwise adjustable. The tray or a portion of it is, for example, supported by at least two support points within the support structure, wherein one of the two support points can be adjusted in its height.

By adjusting the inclination of the tray to a length of the high voltage cable, it is possible to take up a cable length tolerance, i.e. to compensate for a difference between the actual cable length and the cable length required for connection with the switch gear. For example, it allows to take up a cable length tolerance of up to 0.5 meter, as given by the difference between the horizontal direction of the tray and the maximum inclined orientation of the tray.

The support structure including the tray is in particular arranged on a switch gear footbridge. The switch gear footbridge is located above, in particular directly above, the switch gear, e.g., above the platform carrying the switch gear. The switch gear footbridge is, in particular, a platform of the wind turbine, in particular of the transition piece of the wind turbine.

According to a further embodiment, the lower part of the high voltage cable is hoisted into the tray by a second winch and/or a carrying strap.

The carrying strap includes, for example, a mesh and/or textile structure. The carrying strap is, for example, laid around and/or fastened to the lower part of the high voltage cable.

The second winch is, for example, arranged on an upper platform of the transition piece. The second winch hoists, for example, the carrying strap carrying the lower part of the high voltage cable.

Hoisting the lower part of the high voltage cable into the tray by the second winch and/or the carrying strap allows to better and more precisely hoist the lower part of the high voltage cable into the tray. In particular, it allows to hoist a long and/or heavy lower part of the high voltage cable into the tray.

According to a further embodiment, the method comprises the step of pivoting at least a portion of the support structure to change an orientation of the lower part of the high voltage cable.

By pivoting at least a portion of the support structure about a vertical axis it is possible to change an orientation of the lower part of the high voltage cable. This allows to further adjust the position at which the lower part of the high voltage cable is coming down towards the switch gear.

The pivotable portion of the support structure includes, for example, pivotable guiding bars for guiding the high voltage cable.

According to a further aspect, a tower of a wind turbine is provided. The tower comprises a high voltage cable configured to connect a generator of the wind turbine with a switch gear of the wind turbine. The high voltage cable is arranged inside the tower such that it is guided from an upper part of the tower to a lower part of the tower, where it is returned up again.

According to a further aspect, a wind turbine is provided. The wind turbine comprises a generator, a switch gear, and a platform above the switch gear. Further, the wind turbine comprises a high voltage cable connecting the generator to the switch gear. Furthermore, the wind turbine comprises means to lower a returned portion of the high voltage cable from the platform towards the switch gear.

The wind turbine is, in particular, an offshore wind turbine located at an offshore wind harvesting site.

The embodiments and features described with reference to the method of the present invention apply mutatis mutandis to the tower and wind turbine of embodiments of the present invention.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with references to the following Figures, wherein like designations denote like members, wherein.

DETAILED DESCRIPTION

Figure 1:
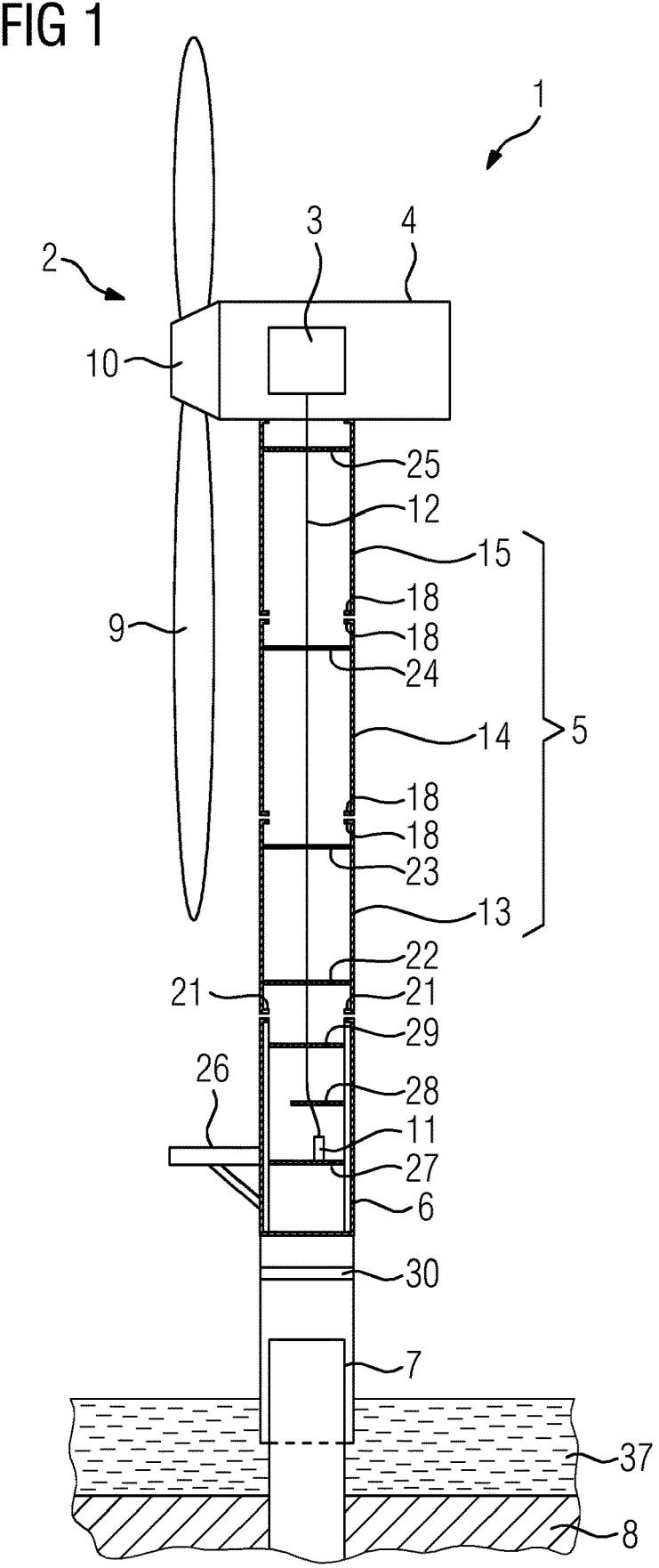
FIG. 1 shows, in partial cross-section, a wind turbine according to an embodiment.

FIG. 1 shows an offshore wind turbine 1 according to an embodiment.

The wind turbine 1 comprises a rotor 2 connected to a generator 3 arranged inside a nacelle 4. The nacelle 4 is arranged at the upper end of a tower 5 of the wind turbine 1. The tower 5 is arranged on a transition piece 6. The transition piece 6 is a "Super Extended Transition Piece" with a height of 40 meters or more. The transition piece 6 is erected on a monopile 7 which is driven into the sea bed 8.

The rotor 2 comprises, for example, three rotor blades 9. The rotor blades 9 are connected to a hub 10 of the wind turbine 1. A shaft (not shown) connects the hub 10 to the generator 3.

The generator 3 is electrically connected to a switch gear 11 in the transition piece 6 by a high voltage cable 12.

The tower 5 comprises one or more tower sections 13, 14, 15. In the example of FIG. 1, the tower 5 comprises a bottom tower section 13, a middle tower section 14, and a top tower section 15. The tower sections 13, 14, 15 include each one or more flanges 18 bolted to a corresponding flange 18 of another tower section 13, 14, 15. Further, the bottom tower section 13 of the tower 5 includes a flange 21 for a bolted connection with the transition piece 6.

The tower 5 comprises inside one or more platforms 22, 23, 24, 25. The tower 5 comprises, for example, a low voltage platform 22 in the bottom tower section 13 on which a low voltage transformer (not shown) is located. The tower 5 comprises, for example, bolt platforms 23 and 24 configured for a worker to bolt the corresponding tower sections 13, 14, 15 to each other when assembling the tower 5.

The transition piece 6 comprises on its outside a landing platform 26 to provide access to the interior of the transition piece 6 and the tower 5. The transition piece 6 comprises further one or more platforms 27, 28, 29 inside. The transition piece 6 comprises, in particular, a switch gear platform 27 on which the switch gear 11 is arranged. Further, the transition piece 6 comprises, for example, a switch gear footbridge 28. The transition piece 6 may further comprise a bolt platform 29 for a worker to connect the transition piece 6 and the tower 5 by bolts.

The transition piece 6 includes inside at a lower end thereof above the monopile 7 an airtight platform 30 to prevent poisonous gases from the sea bed 8 from entering the upper part of the transition piece 6.

In the following, a method for manufacturing the wind turbine 1 of FIG. 1 is described.

Figure 2:
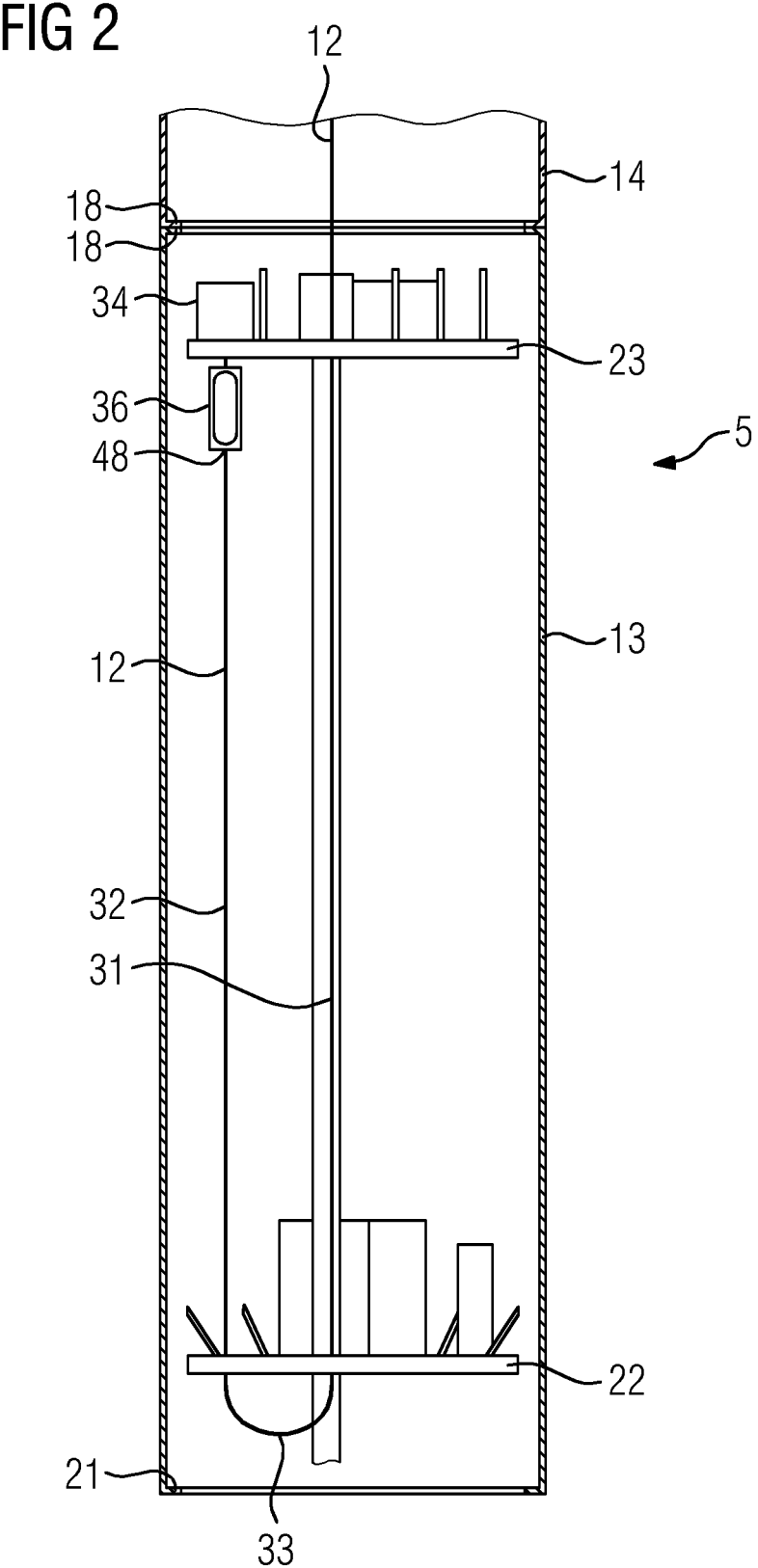
FIG. 2 shows, in cross-section, a portion of a tower of the wind turbine of FIG. 1.

FIG. 2 shows a detailed view of a portion of the tower 5 of FIG. 1, in particular the bottom tower section 13.

In a step S1 of the method, the high voltage cable 12 is guided inside the tower 5 of the wind turbine 1 from an upper part of the tower 5 to a lower part of the tower 5. The upper part of the tower 5 is, for example, the platform 25 shown in FIG. 1. The lower part of the tower 5 is, for example, a part below the platform 22. The portion of the high voltage cable 12 guided from the upper part of the tower 5 (platform 25) to the lower part of the tower 5 (below platform 22) is henceforth called first portion 31 (FIG. 2) of the high voltage cable 12.

In a step S2, the high voltage cable 12 is returned at the lower part of the tower 5, i.e. below platform 22, up again. In the example of FIG. 2, the high voltage cable 12 is returned with its free end 48 up to the bolt platform 23 of the bottom tower section 13. The portion of the high voltage cable 12 returned from the lower part of the tower (below platform 22) up to the bolt platform 23 is henceforth called second portion 32 (FIG. 2) of the high voltage cable 12. The high voltage cable 12 forms a U-shape 33 between the first portion 31 and the second portion 32 (FIG. 2). The U-shape 33 comprises a semi-circular portion, a first leg being continuous with the first portion 31 and a second leg being continuous with the second portion 32.

The high voltage cable 12 is returned by a winch 34 arranged on the platform 23. The winch 34 includes a rope 35 (FIG. 4) which is connected to the free end 48 of the second portion 32 of the high voltage cable 12 via a protection cap 36. The protection cap 36 is, for example, a steel cap releasably fastened to the free end 48. By winding up the rope 35, the winch 34 pulls up the second portion 32 of the high voltage cable 12.

In a step S3, the tower 5 comprising the high voltage cable 12 guided from the platform 25 to below the platform 22 and returned up again to the platform 23 is transported by a jack-up vessel 19 to the wind harvesting site 20 out at sea.

Figure 3:
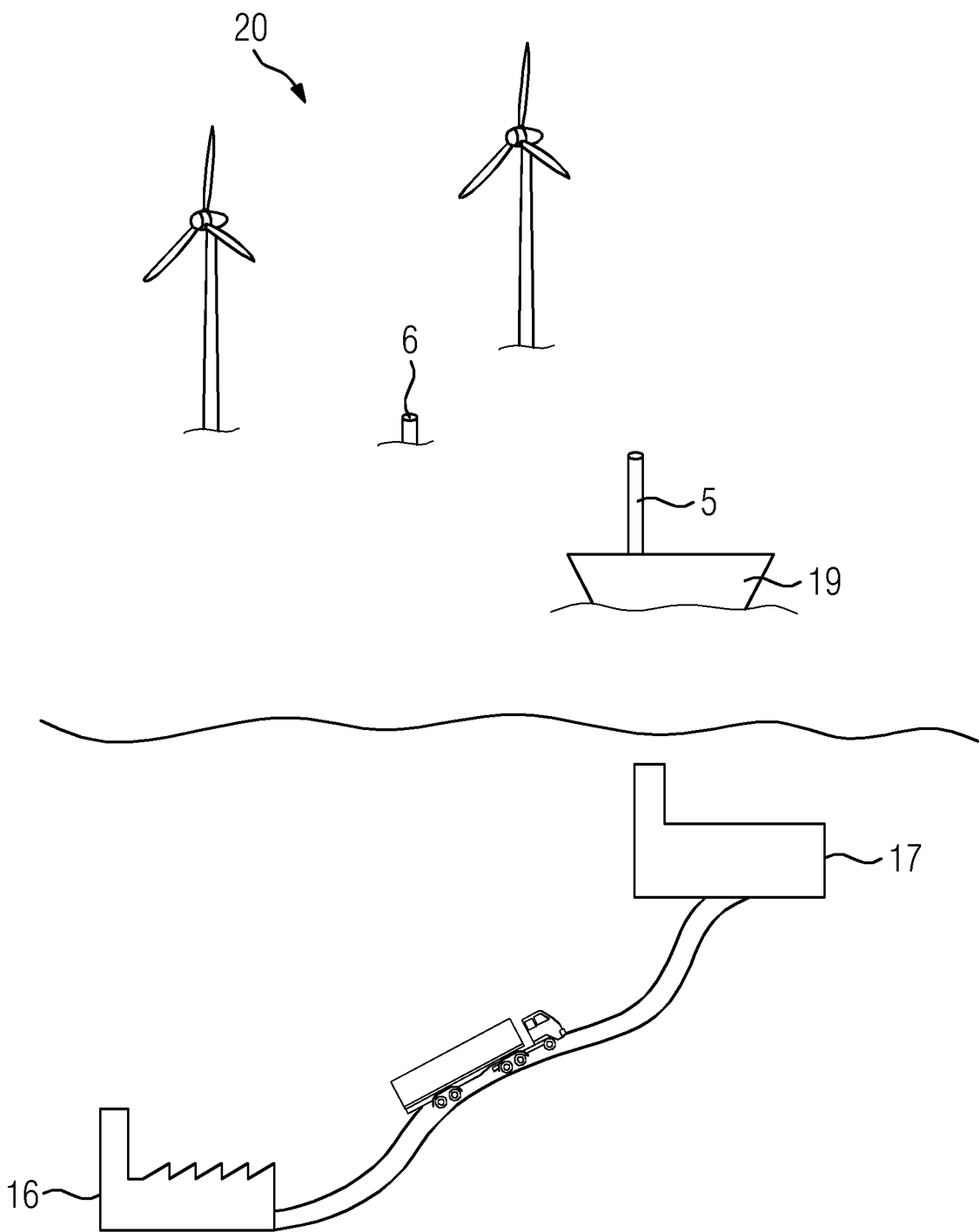
FIG. 3 shows schematically the transport of the tower of FIG. 2 to a wind harvesting site according to an embodiment.

FIG. 3 shows schematically the route of transport from a factory hall 16 to a harbor site 17 and further to the offshore wind harvesting site 20. The tower sections 13, 14, 15 that have been manufactured at the factory hall 16 are transported to the harbor site 17. At the harbor site 17, the tower sections 13, 14, 15 are assembled to form the tower 5 and the high voltage cable 12 is installed inside the tower 5 according to method steps S1 and S2. From the harbor site 17 the tower 5 is transported by the vessel 19, in particular in a vertical orientation, to the wind harvesting site 20.

In a step S4, the tower 5 is arranged on the transition piece 6 (FIG. 3) which was connected beforehand to a foundation of the wind turbine 1 such as a monopile 7.

Figure 4:
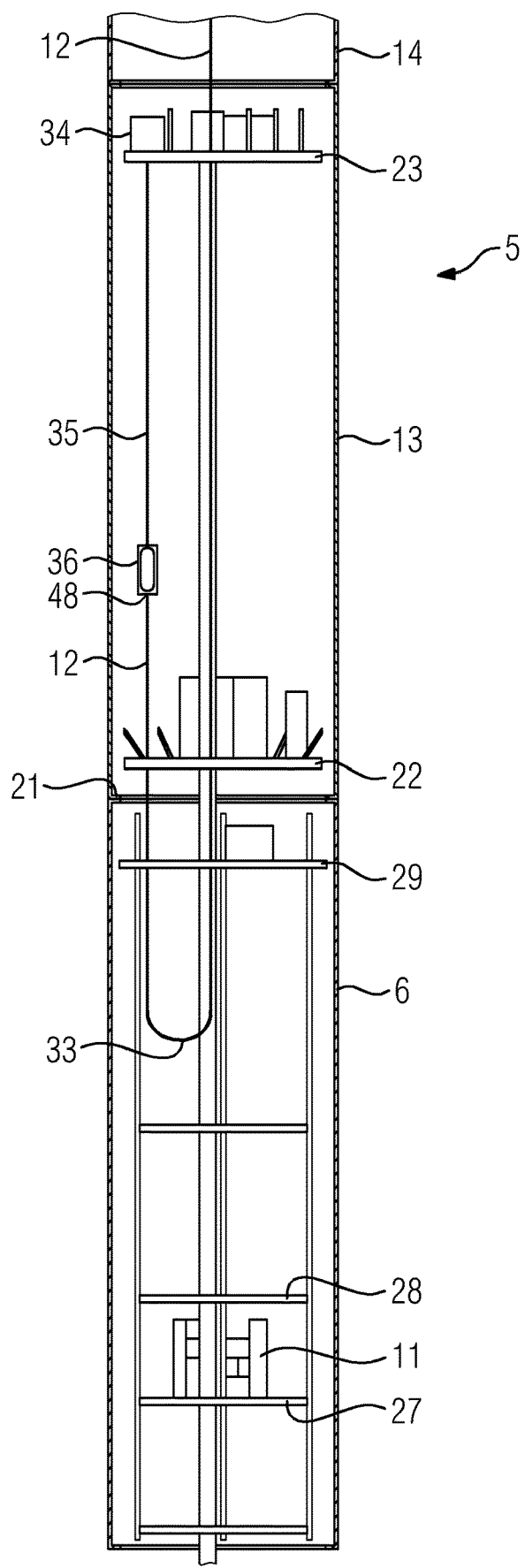
FIG. 4 shows, in cross-section, a portion of the tower of the wind turbine of FIG. 2 erected on a transition piece.
Figure 5:
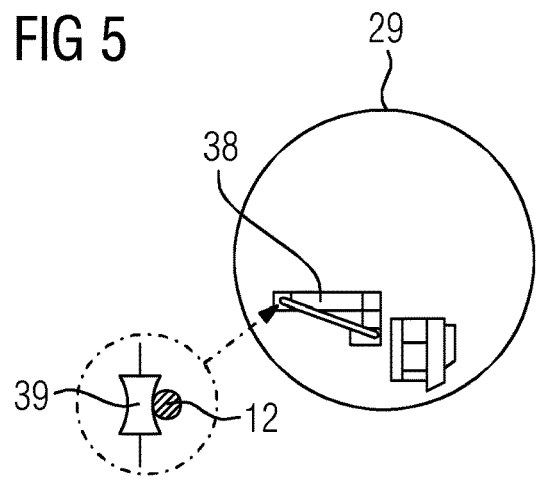
FIG. 5 shows, in plan view, a platform of the transition piece FIG. 4.

In a step S5, the high voltage cable 12 is lowered into the transition piece 6, as shown in FIG. 4. By unwinding the rope 35 of the winch 34, the high voltage cable 12 is gradually lowered into the transition piece 6 and towards the switch gear 11 on the switch gear platform 27. In particular, the U-shape 33 of the high voltage cable 12 is lowered successively into the transition piece 6. In order to pass platforms between the lower part of the tower 5 and the switch gear 11, such as the platform 29 of the transition piece 6, these platforms comprise cutouts 38. FIG. 5 shows exemplarily a cutout 38 of the platform 29 in a plan view. The U-shape 33 of the high voltage cable 12 is lowered through the cutout 38. The cutout 38 includes a roller assembly 39 to guide the high voltage cable 12 smoothly through the cutout 38. As shown in the enlarged view of FIG. 5, the roller assembly 39 includes one or more rolls 39 arranged in one of the corners of the cutout 38.

After the high voltage cable 12 has been lowered all the way to the switch gear platform 27, the rope 35 and the protection cap 36 are disconnected from the high voltage cable 12.

Figure 6:
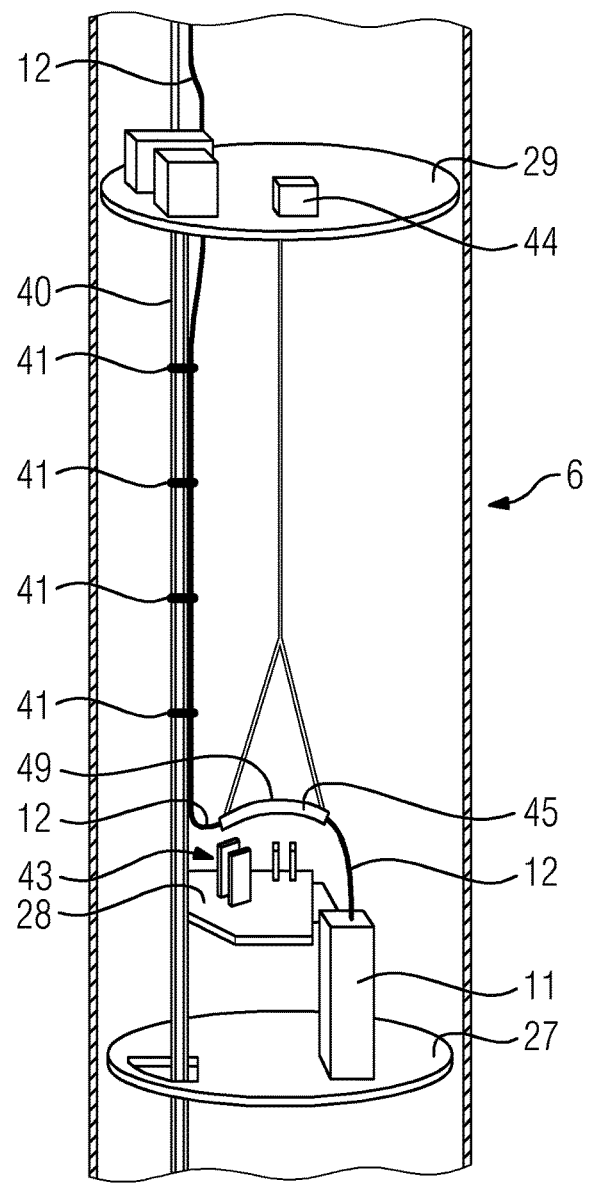
FIG. 6 shows, in partial perspective view, a portion of the transition piece of FIG. 4.

In a step S6, the high voltage cable 12 is fixed to a ladder 40 inside the transition piece 6 at several connection points 41 in order to support the weight of the high voltage cable 12, as shown in FIG. 6.

Figure 7:
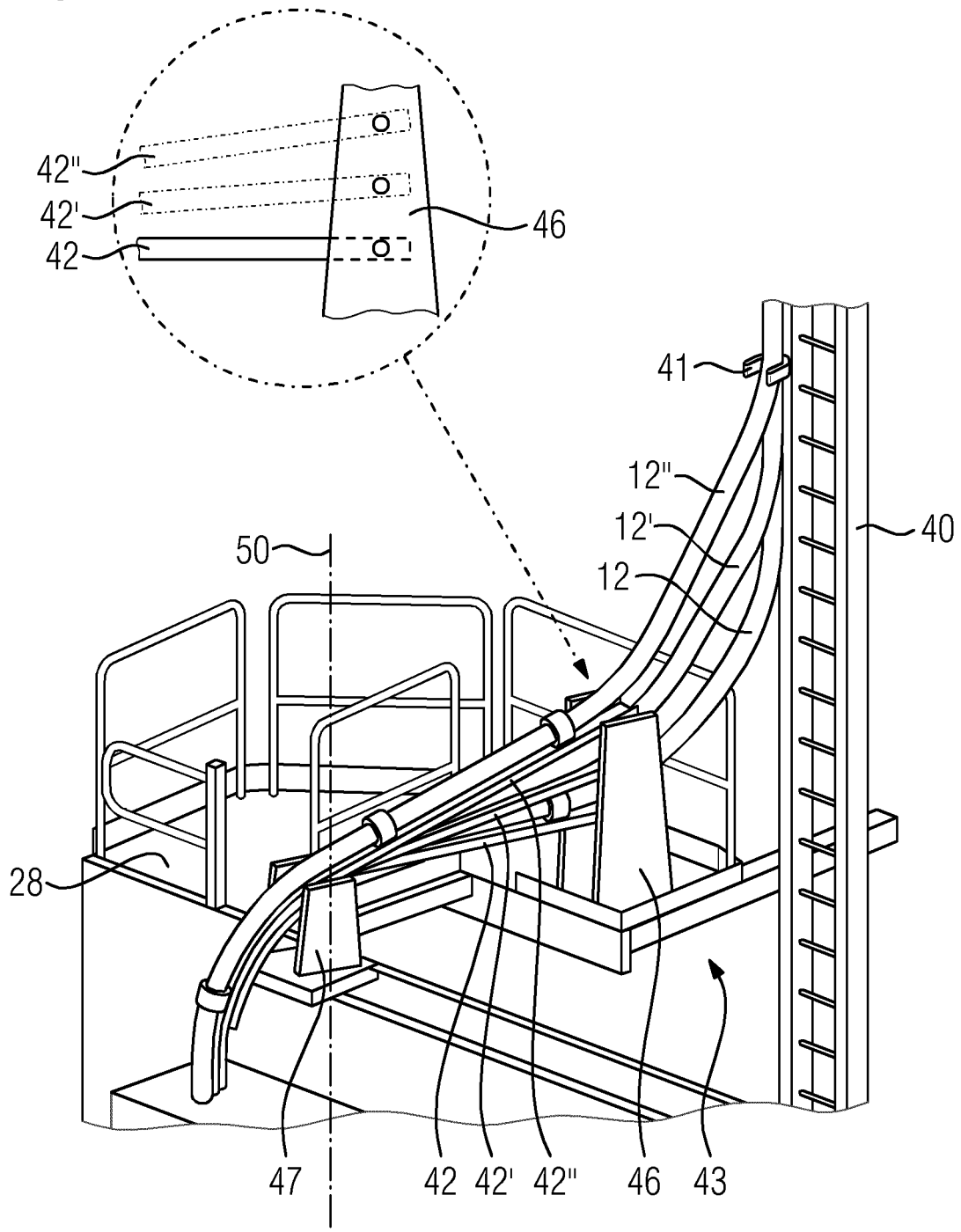
FIG. 7 shows, in perspective view, a switch gear footbridge with a support structure according to an embodiment.

In a step S7, a lower part 49 of the high voltage cable 12 is hoisted into a tray 42 of a support structure 43 located on the switch gear footbridge 28, as shown in FIGS. 6 and 7. The lower part 49 of the high voltage cable 12 is hoisted by a second winch 44 arranged on the platform 29 and by a carrying strap 45 (FIG. 6). The carrying strap 45 includes a mesh structure that is laid around a portion of the lower part 49 of the high voltage cable 12. The second winch 44 then hoists the carrying strap 45 that is carrying the lower part 49 of the high voltage cable 12. Thereby, the second winch 44 hoists the high voltage cable 12 into the tray 42 (FIG. 7).

In a step S8, the inclination of the tray 42 is adjusted to a length of the high voltage cable 12. By increasing the inclination of the tray 42 for shorter cables 12 and decreasing the inclination for longer cables 12, it is possible to take up tolerances of the high voltage cable 12. As shown in FIG. 7, the support structure 43 includes means 46 to adjust the inclination of the tray 42. The means 46 include, for example, two supporting plates with each three bolts. FIG. 7 shows three different examples for inclining the tray 42 denoted with 42, 42' and 42". In the first example, the tray 42 is accommodating the high voltage cable 12 in a horizontal orientation. In the second example, the tray 42' is accommodating the high voltage cable 12' in an inclined orientation. In the third example, the tray 42" is accommodating the high voltage cable 12" in a more inclined orientation. The enlarged view of FIG. 7 shows the means 46 to adjust the inclination of the tray 42 along with the tray 42, 42', 42" at the three different example inclinations. The high voltage cable 12, 12', 12" is omitted in the enlarged view of FIG. 7 for clarity.

In a step S9, a portion 47 of the support structure 43 is pivoted to change an orientation of the lower part 49 of the high voltage cable 12. The support structure 43 includes means to pivot the portion 47 about a vertical axis 50. In the example of FIG. 7, the portion 47 includes pivotable guiding bars. By pivoting the portion 47 of the support structure 43, the position at which the lower part 49 of the high voltage cable 12 is coming down towards the switch gear 11 is further adjusted.

In a step S10, the free end 48 of high voltage cable 12 is connected with the switch gear 11.

Figure 8:
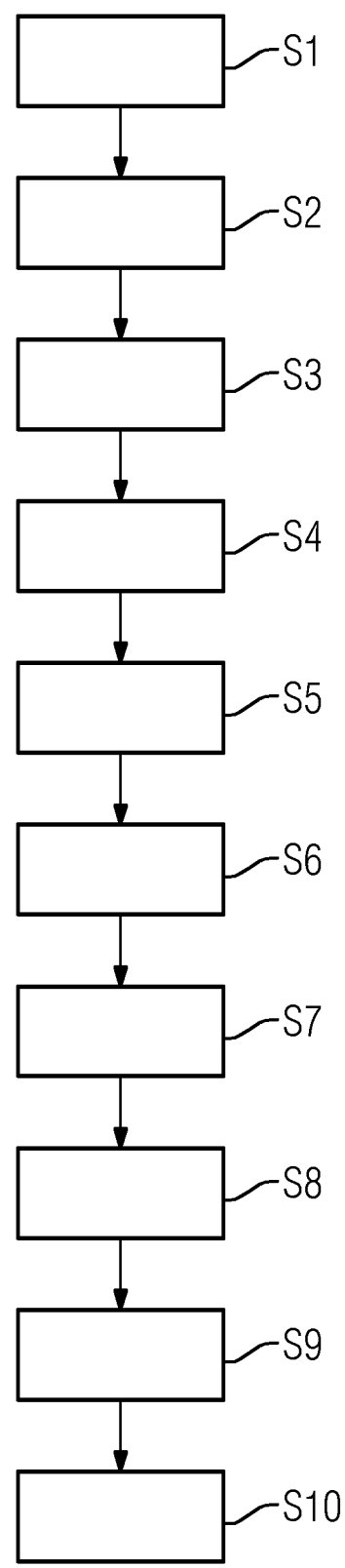
FIG. 8 shows a flowchart illustrating a method for manufacturing a wind turbine according to an embodiment.

FIG. 8 shows the described method steps S1 to S10 in a flowchart.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for manufacturing an offshore wind turbine, the wind turbine comprising a high voltage cable configured to connect a generator of the wind turbine with a switch gear of the wind turbine, the method comprising:
   a) assembling a tower of the wind turbine from several tower sections and guiding the high voltage cable inside the assembled tower from an uppermost platform of the tower to a lower part of the tower, the lower part being the lowermost platform of the tower or a part below the lowermost platform of the tower,
   b) returning the high voltage cable at the lower part of the tower up again,
   c) transporting the assembled tower to an offshore wind harvesting site by means of a vessel,
   d) arranging the tower on a transition piece of the wind turbine, the transition piece being connected to a foundation of the wind turbine,
   e) lowering the high voltage cable into the transition piece and towards the switch gear in the transition piece,
   f) hoisting a lower part of the high voltage cable into a tray of a support structure, the support structure being located on a switch gear footbridge, and
   g) adjusting an inclination of the tray to a length of the high voltage cable.

2. The method according to claim 1, wherein the high voltage cable is returned at the lower part of the tower up again such that it forms a U-shape.

3. The method according to claim 2, wherein the high voltage cable is lowered into the transition piece by lowering the U-shape of the high voltage cable into the transition piece.

4. The method according to claim 1, wherein the high voltage cable is returned at least up to a first platform of the tower.

5. The method according to claim 4, wherein the high voltage cable is returned by a winch.

6. The method according to claim 5, wherein the winch is located on the first platform or on a second platform of the tower and/or includes a rope connected to a free end of the high voltage cable.

7. The method according to claim 1, wherein the high voltage cable is lowered into the transition piece by lowering it through cutouts in one or more platforms of the tower and/or the transition piece.

8. The method according to claim 7, wherein one or more of the cutouts include a roller assembly to guide the high voltage cable through the cutout.

9. The method according to claim 1, comprising the step of fixing the high voltage cable to a ladder of the wind turbine.

10. The method according to claim 1, wherein the lower part of the high voltage cable is hoisted into the tray by a second winch and/or a carrying strap.

11. The method according to claim 1, comprising pivoting at least a portion of the support structure to change an orientation of the lower part of the high voltage cable.

* * * * *